June 28, 1932.  F. H. OWENS  1,865,272
FILM MAGAZINE FOR MOTION PICTURE CAMERAS
Filed Oct. 5, 1929
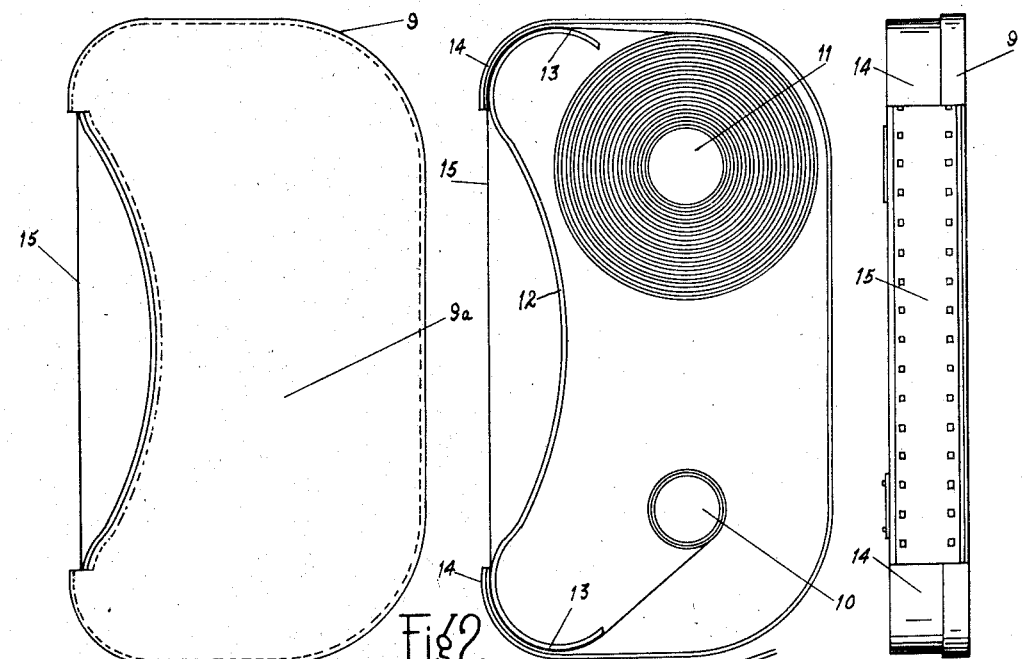
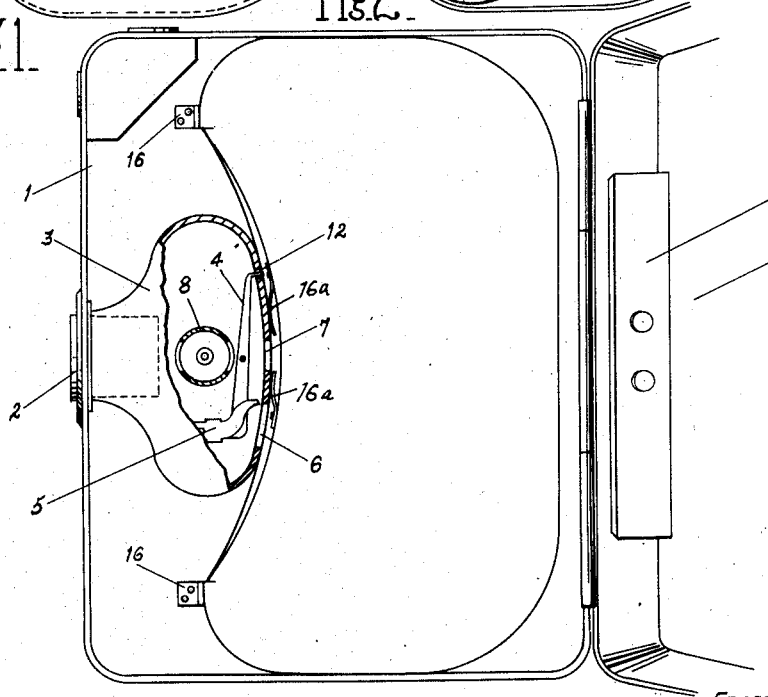
INVENTOR.
FREEMAN H. OWENS.
BY
ATTORNEY.

Patented June 28, 1932

1,865,272

UNITED STATES PATENT OFFICE

FREEMAN H. OWENS, OF NEW YORK, N. Y., ASSIGNOR TO OWENS DEVELOPMENT CORPORATION, OF NEW YORK, N. Y., A CORPORATION OF NEW YORK

FILM MAGAZINE FOR MOTION PICTURE CAMERAS

Application filed October 5, 1929. Serial No. 397,502.

This invention relates to improvements in film magazines for motion picture cameras, the principal object of the invention being to provide a daylight loading magazine which is particularly well adapted for use with cameras of the so-called motor type, the magazine being of such construction that it may be placed in the camera with the film in position for winding and operation, thus eliminating the necessity of threading the film through the camera as is the usual practice.

Other objects and advantages of the invention will appear as the description proceeds.

In the drawing accompanying this specification,

Figure 1 is a side view of a magazine constructed in accordance with the present invention and having a film in position therein ready to be placed in a camera;

Figure 2 is a side view of the magazine with its cover removed;

Figure 3 is a front view thereof; and

Figure 4 is a side view of a camera body parts being shown in section and showing the magazine in position therein, the hinged cover of the camera being shown in open position and broken away.

Referring to the drawing, 1 designates a camera body in one wall of which is mounted a lens 2, and within the camera immediately back of said lens and in alignment therewith is secured a housing 3 in which is disposed a device of well known construction for imparting intermittent movement to a film passing through the camera. This device comprises pivoted levers 4 and 5, the latter having a claw-shaped end adapted intermittently to pass through an elongated opening 6 in the housing wall and engage one of the usual perforations adjacent the edges of a film and move the film along one step, while the lever 4 is provided with a bent up end which passes through an opening in the wall of the housing and also engages with one of the perforations in the film to provide a registration pin, the timing of the movements of the lever being such that when the lever 4 with its registration pin is in engagement with the film the lever 5 is out of engagement and vice versa.

The operation of this form of intermittent film advancing means is so well known that it has been deemed unnecessary to illustrate herein the mechanism for operating the levers. The wall of the housing 3 is so formed as to provide a film gate having a convex surface and in which is formed an exposure opening 7 in alignment with the lens 2, a barrel type shutter 8 being mounted for rotation in position to control the passage of light from the lens through said opening.

The magazine 9 shown herein is of special construction, and carries the usual take-up and supply film reels 10 and 11 respectively. The front wall of the magazine is concaved, that is to say curved inwardly in an arc of comparatively large radius as indicated at 12, while its ends are curved outwardly in arcs of comparatively small radii, as indicated at 13, said end curvatures extending behind and being spaced a short distance from the forward curved ends 14 of the end walls of the magazine thereby to form between the overlapping ends of the front and end walls spaces or channels through which the film 15 is guided during its passage from the supply to the take-up reel. It will thus be obvious that when passing from one end wall toward the other the film will traverse a path forming the chord of the arc-shaped front wall as shown clearly in Figures 1 and 2, the curved overlapping ends of the front and end walls forming an effective light lock for excluding light from the magazine at those points. It will be understood, of course, that the magazine is provided with a removable cover 9a the front of which is of a configuration adapted to fit the curved and overlapping front and end walls of the magazine.

The magazine above described is adapted to fit within the camera box, with its curved front wall toward the exposure opening 7 in the wall of the intermittent movement housing. A pair of lugs 16 are secured on the wall of the camera at the interior thereof to provide stops for the upper and lower ends of the magazine when the latter is placed in position in the camera. The curvature of the wall of the housing 3 is different from that of the front wall of the magazine, and the lugs 16 are so located that when the ends of the magazine are in abutting relation with said lugs the portion of the film outside of the magazine will be maintained in close contact with the curved surface of the housing or gate and will overlie the exposure opening 7 and thus always be in proper focus at the point of exposure, while the curved wall of the magazine will be maintained out of contact with the housing or with the film at that point as shown in Figure 4. If desired, light leaf springs 16a may be provided at the magazine to normally hold the film in flat engagement with the gate. The camera cover 17, which is shown hinged to the camera, may be provided on its rear wall with a flat leaf spring 18 adapted to engage the rear wall of the magazine and thereby resiliently maintain it in its forward lug engaging position.

By reason of this construction, the normal tension placed upon the film reels in the magazine is enhanced by the tension of that portion of the film forming the chord at the front of the magazine, which is thus maintained constantly in close engagement with the curved gate formed by the wall of the housing 3.

I claim:

1. The combination with a motion picture camera, of an exposure gate having a convex surface disposed in said camera, a film magazine having a concave wall and provided with film guiding channels at opposite ends of said wall thereby to permit travel of a film from one guide channel to the other in a path forming the chord of said wall, and means for maintaining said chord in close contact with the convex surface of said gate.

2. The combination with a motion picture camera, of a housing disposed within said camera and having an exposure gate provided with a convex surface, a film magazine having a concave wall and provided with film guiding channels at opposite ends of said wall thereby to permit travel of a film from one channel to the other in a path forming the chord of said wall, means for maintaining said chord in close contact with the convex surface of said gate, and an intermittently acting film moving device mounted in said housing and having film engaging means adapted to project through openings in said gate for alternately moving and stopping said film.

3. The combination with a motion picture camera, of an exposure gate having a convex surface disposed in said camera, a film magazine having a concave wall and provided with film guiding channels at opposite ends of said wall thereby to permit travel of a film from one guide channel to the other in a path forming the chord of said wall, means for resiliently urging said magazine toward the gate thereby to maintain said chord in close contact with the convex surface of said gate, stop members carried by said camera for maintaining the magazine with its concave wall out of contact with the said contact surface.

4. The combination with a motion picture camera, of a housing disposed within said camera and having an exposure gate provided with a convex surface, a film magazine having a concave wall and provided with film guiding channels at opposite ends of said wall thereby to permit travel of a film from one channel to the other in a path forming the chord of said wall, means for resiliently urging said magazine toward the gate thereby to maintain said chord in close contact with the convex surface of said gate, stop members carried by said camera for maintaining the magazine with its concave wall out of contact with the said contact surface, and an intermittently acting film moving device mounted in said housing and having film engaging means adapted to project through openings in said gate for alternately moving and stopping said film.

5. In combination, a camera having a curved exposure gate, a film magazine having a curved wall adapted to lie adjacent said gate, means for supporting a film in said magazine, said film extending outside said magazine across said curved wall, whereby when said magazine is placed in said camera, said film will engage said curved gate.

6. In combination, a camera having a curved exposure gate, a film magazine having a curved wall adapted to lie adjacent said gate, means for supporting a film in said magazine, said film extending outside said magazine across said curved wall, whereby when said magazine is placed in said camera, said film will engage said curved gate, and resilient means for maintaining said film in engagement with said gate.

7. In combination, a camera having a gate provided with an exposure opening, a film magazine having a concave wall, a film in said magazine and having a length extending outside said magazine and across the concave portion thereof, and means in said camera for positioning said magazine so that said gate extends into said concave portion and with the exposure opening in registry and engagement with said outside length of film.

In testimony whereof, I affix my signature.

FREEMAN H. OWENS.